US008798637B2

(12) United States Patent
Gao et al.

(10) Patent No.: US 8,798,637 B2
(45) Date of Patent: *Aug. 5, 2014

(54) ELECTRONIC MESSAGE EXCHANGE OVER MULTIPLE WIRELESS COMMUNICATION NETWORKS WITH A SINGLE DEVICE

(75) Inventors: Xiaofeng Gao, Alpharetta, GA (US); Wei Zhao, Alpharetta, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/590,950

(22) Filed: Aug. 21, 2012

(65) Prior Publication Data

US 2012/0315946 A1  Dec. 13, 2012

Related U.S. Application Data

(63) Continuation of application No. 12/727,769, filed on Mar. 19, 2010, now Pat. No. 8,249,593, which is a continuation of application No. 11/407,678, filed on Apr. 20, 2006, now Pat. No. 7,715,843.

(51) Int. Cl.
*H04W 72/00* (2009.01)
(52) U.S. Cl.
USPC ............... 455/452.2; 455/435.1; 455/450; 455/453; 455/515
(58) Field of Classification Search
CPC ....... H04W 4/12; H04W 72/02; H04W 72/04; H04W 76/025; H04L 41/0681; H04L 43/10; H04L 43/0817
USPC ........ 455/426.2, 428, 432.1–453, 456.1–457; 370/328–334
See application file for complete search history.

(56) References Cited

U.S. PATENT DOCUMENTS

| 6,119,003 | A | 9/2000 | Kukkohovi | |
|---|---|---|---|---|
| 7,184,417 | B2 * | 2/2007 | Proctor, Jr. | 370/329 |
| 7,206,301 | B2 | 4/2007 | Wu et al. | |
| 7,302,258 | B1 | 11/2007 | Sylvain | |
| 7,376,112 | B2 | 5/2008 | Liu | |
| 2002/0080024 | A1 * | 6/2002 | Nelson et al. | 340/503 |
| 2002/0147008 | A1 | 10/2002 | Kallio | |
| 2003/0128676 | A1 | 7/2003 | Lee | |
| 2004/0176129 | A1 * | 9/2004 | Menon et al. | 455/554.1 |
| 2004/0180655 | A1 | 9/2004 | Jang et al. | |
| 2004/0203788 | A1 | 10/2004 | Fors et al. | |
| 2005/0009530 | A1 | 1/2005 | Rouffet et al. | |
| 2005/0128981 | A1 | 6/2005 | Creamer et al. | |

(Continued)

OTHER PUBLICATIONS

U.S. Office Action dated Oct. 13, 2010 in U.S. Appl. No. 12/727,769.

(Continued)

*Primary Examiner* — Dai A Phuong
(74) *Attorney, Agent, or Firm* — Hartman & Citrin LLC (57) ABSTRACT

Electronic messages such as pages are exchanged between a user device and a message service using one of multiple wireless communication networks. The wireless communication networks may include mobile and/or fixed wireless networks. The user device registers with the message service through at least one of the wireless communications networks. The user device may register through multiple wireless communication devices when available. The user device sends messages through the wireless network through which registration has been established and may apply rules to choose when registration has occurred via multiple wireless networks.

16 Claims, 4 Drawing Sheets

(56) References Cited

U.S. PATENT DOCUMENTS

| | | | |
|---|---|---|---|
| 2006/0025141 A1* | 2/2006 | Marsh et al. | 455/445 |
| 2006/0111134 A1* | 5/2006 | Mills | 455/518 |
| 2006/0274711 A1 | 12/2006 | Nelson et al. | |
| 2006/0294204 A1 | 12/2006 | Kotzin | |
| 2007/0015536 A1* | 1/2007 | LaBauve et al. | 455/552.1 |
| 2007/0021971 A1* | 1/2007 | McKinney et al. | 705/1 |
| 2007/0133665 A1 | 6/2007 | Litwin | |
| 2007/0140174 A1 | 6/2007 | Proctor, Jr. | |
| 2007/0165516 A1 | 7/2007 | Xu et al. | |
| 2008/0159244 A1* | 7/2008 | Hunziker | 370/338 |
| 2009/0170519 A1 | 7/2009 | Wilhoite et al. | |
| 2012/0184300 A1* | 7/2012 | Crandall et al. | 455/456.3 |

OTHER PUBLICATIONS

U.S. Office Action dated Mar. 22, 2011 in U.S. Appl. No. 12/727,769.
U.S. Office Action dated Jul. 19, 2011 in U.S. Appl. No. 12/727,769.
U.S. Office Action dated Dec. 29, 2011 in U.S. Appl. No. 12/727,769.
U.S. Notice of Allowance dated Apr. 12, 2012 in U.S. Appl. No. 12/727,769.
U.S. Office Action dated Feb. 27, 2008 in U.S. Appl. No. 11/407,678.
U.S. Office Action dated Sep. 4, 2008 in U.S. Appl. No. 11/407,678.
U.S. Office Action dated Feb. 13, 2009 in U.S. Appl. No. 11/407,678.
U.S. Office Action dated Jul. 28, 2009 in U.S. Appl. No. 11/407,678.
U.S. Notice of Allowance dated Dec. 31, 2009 in U.S. Appl. No. 11/407,678.

* cited by examiner

FIG. 7

ELECTRONIC MESSAGE EXCHANGE OVER MULTIPLE WIRELESS COMMUNICATION NETWORKS WITH A SINGLE DEVICE This application is a continuation of U.S. patent application Ser. No. 12/727,769, filed Mar. 19, 2010, now U.S. Pat. No. 8,249,593; which is a continuation of U.S. patent application Ser. No. 11/407,678, filed Apr. 20, 2006, now U.S. Pat. No. 7,715,843; the contents of which are incorporated by reference herein in their entirety into this disclosure.

TECHNICAL FIELD

The present invention is related to electronic message exchange. More particularly, the present invention is related to exchanging electronic messages between a user device and a message service over multiple wireless communication networks.

BACKGROUND

Currently, portable communication devices that provide for exchanging electronic messages between users utilize a mobile wireless communication network, such as a Global System for Mobile Communications (GSM) or a Code Division Multiple Access (CDMA) network. This channel of communication is relatively narrowband but short electronic pages are not bandwidth intensive. However, the coverage area may be somewhat limited or hindered by obstructions. Furthermore, each message sent or received by a portable device operating on this mobile wireless communication network may be subject to a separate fee imposed by the carrier service.

Alternative wireless networks, including fixed wireless networks such as Wi-Fi are becoming increasingly available both in and out of areas served by the mobile wireless communication networks. This is especially true on campuses where there are many Wi-Fi access points providing a large coverage area including indoor and outdoor locations. While in some cases such fixed wireless networks may require a subscription before a user obtains access, once connected users may send and receive electronic messages including emails and instant messages without incurring a per message charge.

Often, individuals desiring to send an electronic message via a portable device that utilizes the mobile wireless network are in range of a fixed wireless network. These individuals may be out of range of the mobile wireless network, such as when in a building, and are thereby prevented from sending and receiving electronic messages. Even when in range of both the mobile and fixed wireless networks, the user may send and receive messages through the mobile wireless network and thereby accrue additional service fees, while the other user involved in the messages may also be in range of a fixed wireless network but is also exchanging the messages through the mobile wireless network and also accruing additional service fees.

SUMMARY

Exemplary embodiments address these issues and others by providing devices that allow for multiple wireless networks to be used to exchange electronic messages. So, if one wireless network is out of range, another wireless network may be utilized. Or, if both wireless networks are in range, rules may be applied to choose which wireless network should be used for the exchange, such as the network with the most bandwidth, greatest signal strength, or least cost per message.

One exemplary embodiment is a portable communication device for exchanging electronic messages. The device includes a first wireless communication system for communicating over a first wireless communication network and a second wireless communication system for communicating over a second wireless communication network. The device further includes a processor that attempts registration with a message service through the first and second wireless communication networks and determines whether to exchange electronic messages via the first wireless communication system or via the second wireless communication system.

Another exemplary embodiment is a computer readable medium including instructions that are executed by a portable communication device to perform acts including attempting registration with a message service through a first wireless communication network and a second wireless communication network. The acts further comprise determining whether to exchange electronic messages via the first wireless communication network or via the second wireless communication network.

DETAILED DESCRIPTION

Exemplary embodiments provide for an end user device, such as a portable interactive pager, smartphone, etc. to send and receive messages through one of multiple wireless networks that may be available from time to time. The most appropriate wireless network at any given time may be chosen for sending messages from or delivering messages to the end user device. Accordingly, the message exchange may be optimized, in terms of performance, reliability, cost, or other parameter for the current situation of the end user device.

Figure 1:
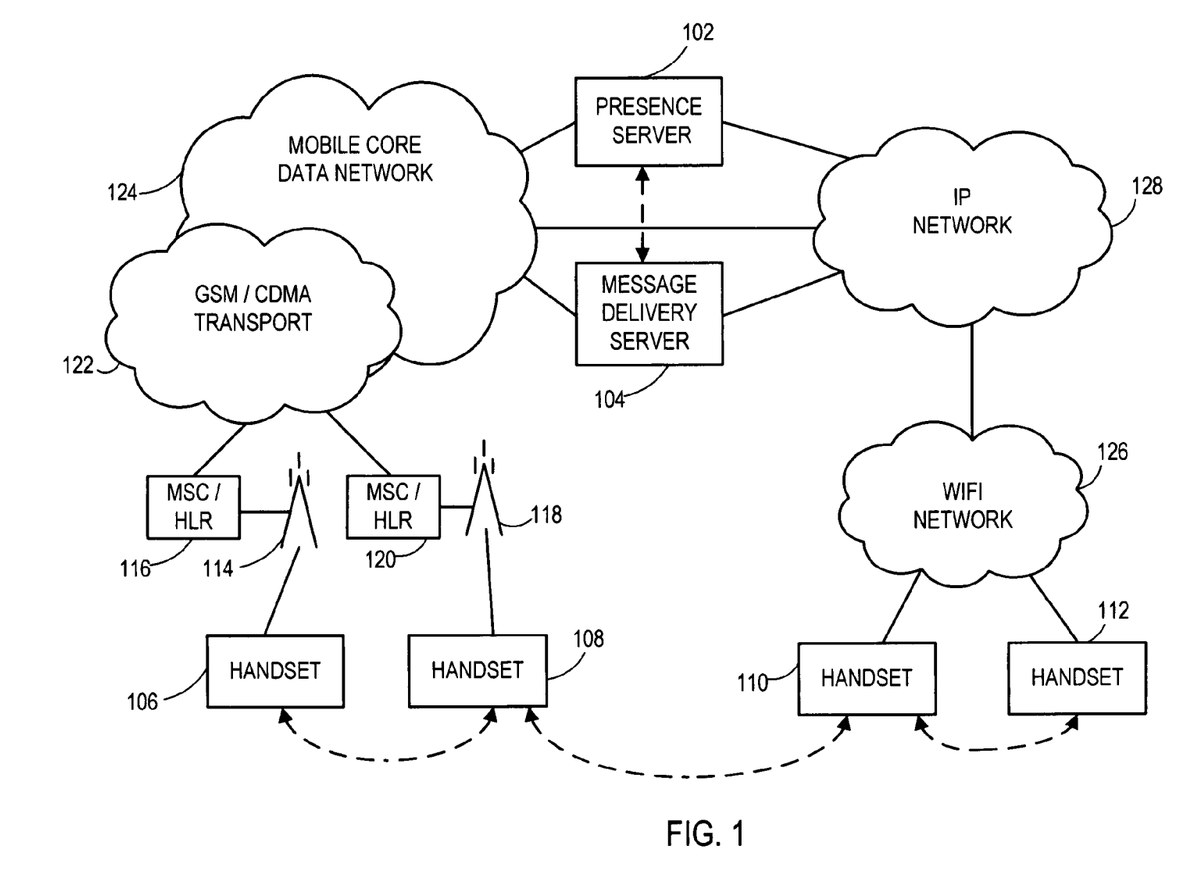
FIG. 1 shows a view of the operating environment of the various embodiments.

One example of an operating environment is shown in FIG. 1. Various data networks are shown including a mobile core data network 124 used to communicate with mobile devices via a mobile wireless transport 122, such as GSM or CDMA. This mobile wireless transport includes mobile switching centers (MSC) 116, 120, each connected to a base station/antenna 114, 118. Portable handsets 106, 108 within range of one of the base stations may communicate wirelessly to send and receive data including electronic messages such as pages. Such electronic messages may be exchanged with other portable devices also in communication with the same or a different base station and may also be exchanged with other portable devices on other wireless networks including fixed wireless networks.

An Internet Protocol network 128 is also shown. A fixed wireless network 126, such as a Wi-Fi network, acts as a node of the Internet Protocol network 128. Various devices may wirelessly communicate with an access point that establishes the Wi-Fi network 126. Portable handsets 110, 112, may communicate with the Wi-Fi network 126 to exchange data including electronic messages such as pages. Such electronic messages may be exchanged with other portable devices also in communication with the same or a different Wi-Fi network and may also be exchanged with other portable devices on other wireless networks including mobile wireless networks.

Some handsets used on one wireless network may also have the capability to connect via a different wireless network. For example, a single handset may have both a mobile wireless network capability and a fixed wireless network capability. An example of such a handset is discussed below in relation to FIGS. 2 and 3. Thus, some of the handsets of FIG. 1 may utilize either the mobile transport 122 and mobile core 124 or the Wi-Fi network 126, either separately or both simultaneously. Other handsets of FIG. 1 may only have the capability to communicate via one wireless network, either the mobile wireless network or the fixed wireless network.

For those handsets that have the capability to utilize multiple wireless networks, such as both a mobile wireless network and a fixed wireless networks, the exchange of electronic messages may occur over any of the types of wireless networks that the handset can use. Thus, when the handset is in range of two different wireless networks at the same time, such as both a mobile wireless network and a fixed wireless network, rules can be applied to determine which wireless network to use when delivering messages to the handset and which wireless network to use when sending messages from the handset. Thus, the exchange of messages from the handset may be facilitated by allowing the handset to utilize whichever type of wireless network is available, and when multiple ones are available, then to use the most appropriate wireless network.

In order to have a message service allowing the handset to use multiple wireless networks when exchanging messages, a message service is provided. This message service of the example of FIG. 1 is provided by a presence server (PS) 102 and a message delivery server (MDS) 104. The presence server 102 maintains a connection to the mobile core data network 124 as well as a connection to the Internet Protocol network 128. The presence server 102 keeps track of which wireless network(s) each handset has registered through, and tracks criteria to use when determining which wireless network is most appropriate for deliveries. The MDS 104 also maintains an interface to each of the wireless networks in order to send and receive messages over each of them. The MDS 104 receives incoming messages addressed to a user of a handset and queries the presence server 102 to find which wireless network to deliver the message over.

While FIG. 1 shows the message service as including the presence server 102 and the MDS 104 as separate devices, it will be appreciated that the functions of the two devices may be integrated into a single device to perform both functions, where queries being generated to determine where to send the message are internal to the single device. However, maintaining the servers as separate devices allows for flexibility in message service architecture, where there may be a requirement for many MDSs 104 while only one or a few presence servers 102.

Figure 2:
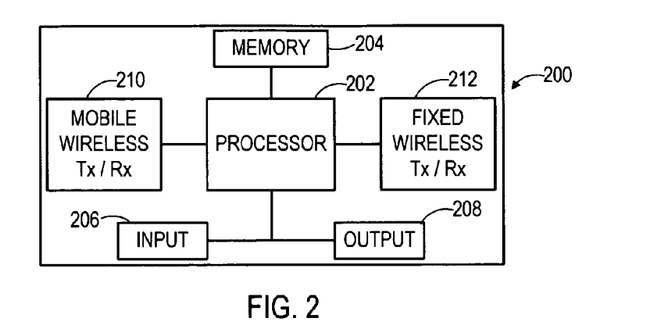
FIG. 2 shows the components of an exemplary handset.

FIG. 2 shows an exemplary embodiment of a handset 200, which may correspond to the handsets 106, 108, 110, and 112 in FIG. 1, having a capability to communicate over two wireless networks, a mobile wireless network and a fixed wireless network in this example. The handset 200 includes a processor 202, such as an application specific processor or a general purpose programmable processor. The processor 202 performs logical operations such as those discussed below in relation to FIG. 3. The handset 200 includes memory 204 that may be separate from or integrated together with the processor 202. The memory stores programming instructions as well as operational data where the processor 202 is programmable and stores operational data otherwise.

Whether hard wired programming instructions of an application specific processor or programming instructions stored in memory of a general purpose programmable processor, such programming instructions are contained on a computer readable medium. This computer readable medium may be in the form of electronic, magnetic, or optical storage and the like and/or may be in the form of wired or wireless connections for the transfer of instructions from one storage location to another.

To allow the user to interact with the handset 200 to generate messages to send and to review received messages, the processor 202 communicates with input devices 206 and output devices 208. The input device 206 may include such devices as a keyboard or keypad, a touch screen, a voice input, and the like which allows the user to enter content for a message. The output device 208 may include audio outputs, visual outputs such as a display screen, tactile outputs, and so forth.

In order to send and receive electronic messages, the processor 202 communicates with wireless communication devices, such as a mobile wireless communication transceiver 210 and a fixed wireless transceiver 212. While these transceivers are shown as separate components, it will be appreciated that these may be incorporated into a single physical component of the handset 200. Thus, the processor 202 may manage communications of the handset to either or both of the wireless networks and may control whether messages are being sent via one wireless network or another.

Figure 3:
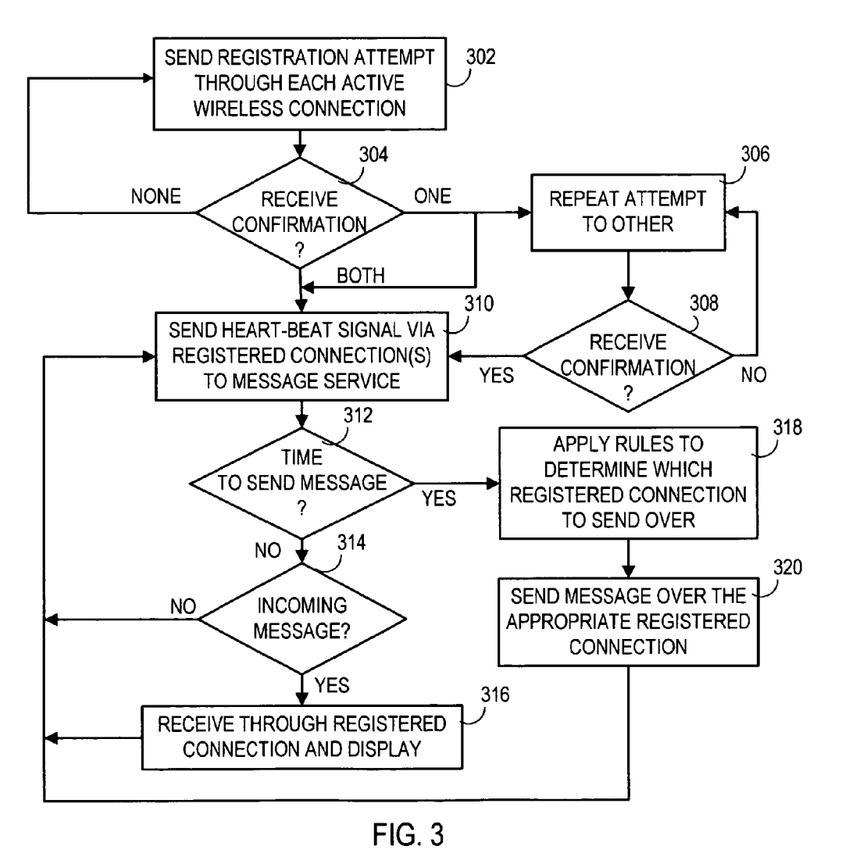
FIG. 3 shows an operational flow of an exemplary handset.

FIG. 3 shows an exemplary set of logical operations performed by the handset 200, and in particular, the processor 202 in order to exchange messages. At registration operation 302, the handset 200 sends a registration message to the message service, such as to the presence server 102, via all available wireless connections that are active. The handset 200 may only be in range of one wireless network such that only one wireless connection is active, or the handset 200 may be in range of multiple wireless networks with multiple active connections. Upon sending the confirmation, the handset 200 waits to receive a confirmation at query operation 304 where it is detected whether a single confirmation is received, whether multiple confirmations, are received, and/or whether a timeout for both registration attempts has occurred. After a timeout period elapses with no confirmation being received for both of the registration attempts, then registration operation 302 may make another attempt.

Where query operation 304 finds that one active connection has received a confirmation, such as because only a single active connection existed and only a single wireless network was used to send the registration, then operational flow may take simultaneous and parallel routes. A first route results in registration operation 306 occurring on behalf of the registration attempt that has yet to be confirmed. Simultaneously, for the registration attempt that has been confirmed, the second route is followed to heartbeat operation 310 which functions in relation to the confirmed wireless network registration. At registration operation 306, additional registrations may be attempted either for wireless network attempts that have not received confirmation or for wireless networks that weren't active before but become active at a later time. Query operation 308 detects whether these additional attempts result in a confirmation. Once a confirmation is received for this registration attempt via the wireless network that has yet to receive a previous confirmation, then operational flow for this parallel path rejoins at heartbeat operation 310 where heartbeat operation 310 then provides functionality for both of the confirmed wireless network registrations.

Where query operation 304 finds that both of the active connections have received their confirmations, as opposed to only one of the active connections receiving a confirmation, then operational flow proceeds to heartbeat operation 310. Here, heartbeat operation 310 provides functionality for both wireless network registrations.

At heartbeat operation 310, the handset 200 sends out a heartbeat signal directed to the message service, such as to the presence server 102. The heartbeat signal is repeated on a periodic basis, the period being a matter of design choice, in order to have the presence server 102 maintain current information regarding whether the registration over a particular wireless network remains valid or whether the connection via that wireless network has terminated. The heartbeat signal is sent over each wireless network path through which a successful registration has occurred so that the presence server 102 is aware of every wireless network available for message delivery.

The heartbeat signal may also be more advanced for certain embodiments. The handset continuously measures performance parameters in the background, such as the signal strength for the connection to each of the wireless networks. Furthermore, the handset may measure the available bandwidth based on measuring the time needed to upload a known amount of data, such as the time taken to upload a previous heartbeat signal. The heartbeat signal may include data that specifies these parameters, such as the current signal strength, the bandwidth measured by the previously sent heartbeat, and so forth. As discussed below, the presence server may utilize this performance data when determining which wireless network to use for delivery.

After the heartbeat signals have started being sent for the one or more wireless networks through which registration was successful, query operation 312 detects whether it is time to send a message based on whether the appropriate user input has been received. If so, then rules are applied at rule operation 318 to determine which wireless connection to send the message over. The rules may be simple, may be dictated by programming of the handset 200, may be specified by the user or may be a combination of the two. One example of a simple rule is if only a single wireless connection is available, then always send over that connection. An alternative to that rule is that if only a single wireless connection is available, then determine whether some other parameter is met, such as a time of day parameter, a performance parameter, etc. and delay sending until the performance parameter is met.

When multiple wireless network connections have been registered with the message service, then the rules may be applied to decide which to use between those registered. For example, the user may set a hierarchy so that anytime a given set of wireless networks are available, one always wins over another regardless of other criteria. As a specific example, where messaging is a fee per message over a mobile wireless network but with no charge per message over a fixed wireless network, the user may specify a rule to always use the fixed wireless if active in order to avoid the charge associated with sending messages over the mobile wireless. As another rule, it may be specified to use the wireless network with the strongest signal or with the most bandwidth.

As other examples of rules, predefined minimum thresholds for signal strength, bandwidth or other performance criteria may be established, either as set by the user or as preprogrammed into the handset. One user rule may specify, for example, how low the signal strength must be for the fixed wireless communication system when the signal strength for the mobile wireless communication system is above a predefined minimum in order for the mobile wireless communication system to be used to exchange the electronic messages. A similar rule may be specified in terms of bandwidth or performance criteria rather than signal strength.

Upon applying the rules to determine the most appropriate wireless network, the message is then sent over that wireless network connection to a corresponding address of the MDS 104 at send operation 320. As in the example of FIG. 1, the MDS 104 may have one network address for the mobile wireless network interface while having another network address for the fixed wireless network interface. These network addresses may be of different formats, where the MDS 104 may have a MIN or other mobile-type address for its mobile wireless address and may have an IP address for its address to be used with fixed wireless network connections. The handset 200 may be preprogrammed with each of those network addresses of the MDS 104 so that the proper network address to use is known once the proper wireless network has been determined. After sending, operational flow returns to heartbeat operation 310.

Returning to query operation 312, after determining that there is no message to currently send, or in parallel with the determination of query 312, query operation 314 determines whether an incoming message is being received over one of the registered wireless connections. If no incoming message is being received, operational flow proceeds back to heartbeat operation 310. Otherwise, the message is received through the registered connection and is then displayed or otherwise output to the user at reception operation 316. Then operational flow returns to heartbeat operation 310.

Figure 4:
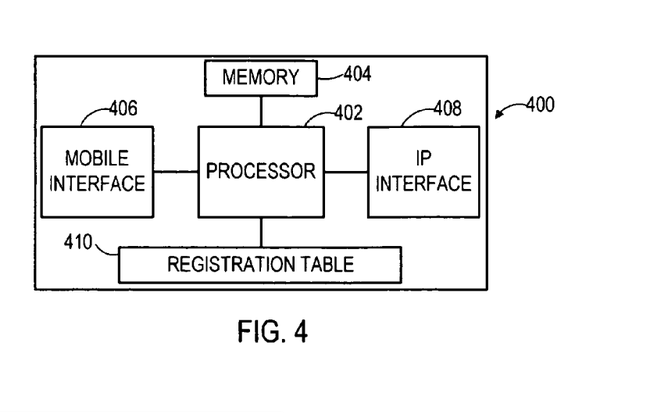
FIG. 4 shows the components of an exemplary presence server.

FIG. 4 shows one exemplary embodiment of a presence server 400, which may correspond to the presence server 102 shown in FIG. 1, having a capability to communicate over two networks, a mobile core network and an IP network in this example. The presence server 400 includes a processor 402, such as an application specific processor or a general purpose programmable processor. The processor 402 performs logical operations such as those discussed below in relation to FIG. 5. The presence server 400 includes memory 404 that may be separate from or integrated together with the processor 402. The memory stores programming instructions as well as operational data where the processor 402 is programmable and stores operational data otherwise.

Whether hard wired programming instructions of an application specific processor or programming instructions stored in memory of a general purpose programmable processor, such programming instructions are contained on a computer readable medium of the presence server 400. This computer readable medium may be in the form of electronic, magnetic, or optical storage and the like and/or may be in the form of wired or wireless connections for the transfer of instructions from one storage location to another.

To allow the presence server 400 to interact with the handset 200 to determine which network is most appropriate for delivering messages to the handset 200, the processor 402 communicates via communication interfaces 406 and 408, such as Ethernet based packet communication interfaces to external networks. While the communication interfaces 406 and 408 are shown as separate components, it will be appreciated that these interfaces may be incorporated into a single physical component of the presence server 400. Thus, the processor 402 may manage communications of the presence server 400 over both of the networks that may be linked to the wireless networks in use by the multitude of handsets being serviced by the presence server 400 and may obtain the registration requests and heartbeat signals and may also submit registration confirmations as is necessary.

In order to keep track of which handsets 200 have registered and over which networks, the presence server 400 maintains a registration table 410 which may be stored in memory 404 or in a dedicated mass storage device. This table tracks each handset 200, the message address of the handset 200, each registered network address of the handset 200, and in certain embodiments the performance criteria that is either measured by the presence server 400 or that is sent to the presence server 400 by the handset 200. An example of a registration table 410 is shown in Table 1 for a handset 200 registered via both a mobile wireless network and a fixed wireless network.

TABLE 1

| Message Address | Mobile Address (MIN) | Mobile Performance | Fixed Address | Fixed Performance |
|---|---|---|---|---|
| joe@abc123.com | 1234567890 | 60% signal | 99.99.99.99 | 90% signal |

Figure 5:
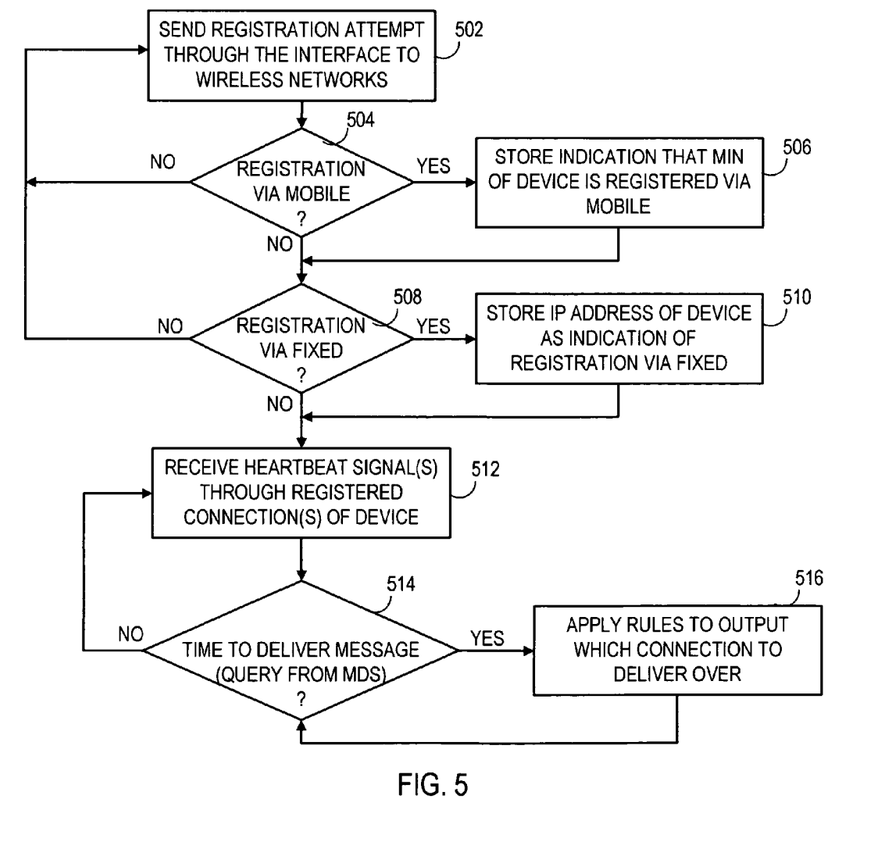
FIG. 5 shows an operational flow of an exemplary presence server.

FIG. 5 shows an exemplary set of logical operations performed by the presence server 400, and in particular, the processor 402 in order to exchange messages. At registration operation 502, the presence server 400 receives an incoming registration attempt from a handset 200 via one or more wireless networks that the handset 200 is connected through. At query operation 504, it is determined whether the registration attempt is received through the mobile wireless network, which occurs when the presence server 400 receives the registration attempt through the interface to the mobile core. The registration attempt through the mobile wireless network identifies the device by its MIN. If the registration attempt is not determined to have been received through the mobile wireless network, the operational flow follows two simultaneous and parallel paths. Operational flow returns to registration operation 502 to continue listening for incoming registration attempts from the mobile wireless network. Operational flow simultaneously proceeds to query operation 508 where it is determined whether an incoming registration attempt has been received from the fixed wireless network.

If the registration attempt is determined to have been received through the mobile wireless network, the flow continues to store operation 506. At store operation 506, the presence server 400 stores an indication of the registration attempt and sends a return confirmation. The stored indication may be storing the received MIN within the registration table in association with the corresponding message address. In this embodiment, the presence server 400 may maintain a separate table associating messages addresses to MINs, as a message address is assigned a particular MIN for the handset 200 at the time of message service setup. As an alternative, the handset 200 may have the user provide the message address, such as when configuring the device or when activating the message service, to be used for the MIN such that the registration provides both the MIN and the message address.

From store operation 506, the flow moves to query operation 508 and it is determined whether a registration attempt has occurred via an additional network such as a fixed wireless network. The registration attempt through the fixed wireless network identifies the device by the IP address of the IP network which the fixed wireless network is connecting through, assuming the fixed wireless network such as a Wi-Fi network is employing network address translation. Via the registration attempt, the Wi-Fi access point maintains the relationship between the handset 200 and the network address of the message service such that communications from the network address of the message service are properly routed to the handset 200.

If it is determined at query operation 508 that a registration attempt has not occurred via an additional network, then operational flow again takes simultaneous and parallel routes. Operational flow returns to registration operation 502 to continue listening for incoming registration attempts through the additional wireless network.

If it is determined that a registration attempt has occurred via an additional network, then at store operation 510, the presence server 400 stores an indication of the registration attempt and sends a return confirmation. The stored indication may be storing the IP address of the fixed wireless network, or the handset 200 itself if no network address translation is being employed, in relation to the message address of the user. As noted above, the message address of the user may be included in the registration attempt. As an alternative, the registration attempt may additionally or alternatively provide the MIN of the handset 200 as well as the IP address, where the MIN is already stored by the presence server 400 in relation to the message address. In either case, the relevant IP address is stored in relation to the message address so that messages can be delivered over the IP network rather than the mobile core network.

From query operation 508 in the situation where no registration attempt has been made via the fixed wireless network, or from store operation 510 in the situation where the registration attempt has been made via the fixed wireless network, the operational flow continues to heartbeat operation 512. Here, the presence server 400 receives the heartbeat signal sent by the handset 200 over each of the registered connections for the handset device 200. As discussed above, the handset 200 provides a way for the presence server 400 to remain updated as to which registered connections are currently active. If a heartbeat is not received within an expiration period, then the registered connection is removed from the registration table. The received heartbeat signals may include data provided by the handset 200 that includes performance criteria for the connection, such as the signal strength over the wireless network, the bandwidth, and so on. The heartbeat signal may be periodically provided by the handset 200 as an unprovoked automatic function, or alternatively, the presence server 400 may periodically submit a request for a heartbeat signal to be sent.

Next, at query operation 514, it is determined whether a query from the MDS 104 has been received regarding which registered network connection to use, if any, to deliver a message to the handset 200. If no query has been received, then operational flow returns to heartbeat operation 512. If a query has been received, then rules are applied at operation 516 to provide an output as a response to the query that indicates which network connection to use at the current point in time. Operational flow then returns to query operation 514 to await the next time for delivering a message to the handset 200. The rules to be applied at operation 516 may be similar to or even the same as those used by the handset 200 when determining which network connection to use when sending a message. For example, the rules may include user specified rules regarding if both network connections are registered, then use one particular connection over another. The rules may instead be specified by the message service.

Figure 6:
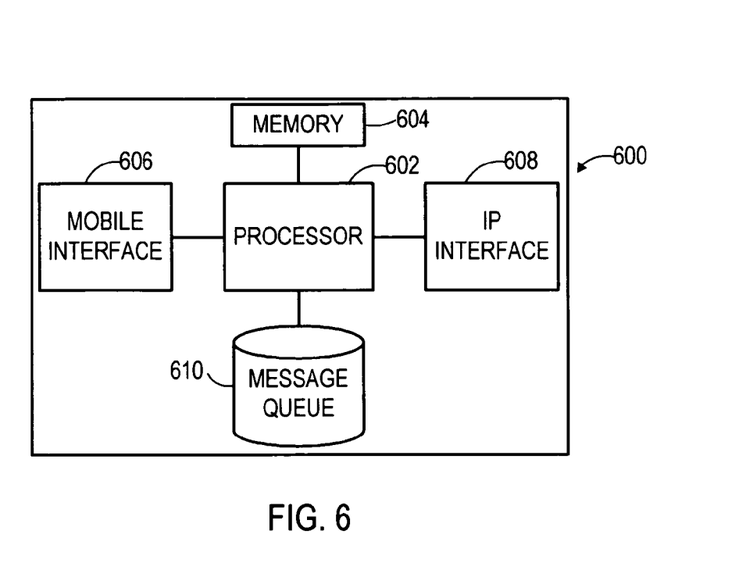
FIG. 6 shows the components of an exemplary message delivery server.

FIG. 6 shows one exemplary embodiment of a message delivery server 600, which may correspond to the message delivery server 104 shown in FIG. 1, having a capability to communicate over two networks, a mobile core network and an IP network in this example. The MDS 600 includes a processor 602, such as an application specific processor or a general purpose programmable processor. The processor 602 performs logical operations such as those discussed below in relation to FIG. 7. The presence server 600 includes memory 604 that may be separate from or integrated together with the processor 602. The memory stores programming instructions as well as operational data where the processor 602 is programmable and stores operational data otherwise.

Whether hard wired programming instructions of an application specific processor or programming instructions stored in memory of a general purpose programmable processor, such programming instructions are contained on a computer readable medium of the MDS 600. This computer readable medium may be in the form of electronic, magnetic, or optical storage and the like and/or may be in the form of wired or wireless connections for the transfer of instructions from one storage location to another.

To allow the MDS 600 to interact with the handset 200 to deliver messages to the handset 200, the processor 602 communicates via communication interfaces 606 and 608, such as Ethernet based packet communication interfaces to external networks. While the interfaces 606 and 608 are shown as separate components, it will be appreciated that these may be incorporated into a single physical component of the MDS 600. Thus, the processor 602 may manage communications of the MDS 600 over both of the networks that may be linked to the wireless networks in use by the multitude of handsets 200 being serviced by the MDS 600 to properly deliver the messages.

In order to maintain all of the incoming messages from all of the message sources for the messaging service being provided, which may include messages from handsets as well as messages from other sources, the MDS 600 maintains a message queue 610 that may be stored in memory 604 or in a dedicated mass storage device. The incoming messages are placed into the queue until a proper network and corresponding address can be determined for each incoming message. There may be a significant delay from the time the message is received by the MDS 600 until the time it can be delivered as the target handset 200 may be unconnected from any network at any given point of time and for a significant duration, such as when the handset 200 is powered off. In that case, the MDS 600 holds the message in the queue 610 at least until the message can be delivered, or until an expiration time, if any, has been reached for the message. The queue 610 may also be used as a backup storage of messages such that the messages are maintained there until a deletion instruction is received from a handset 200 or until the message expiration time, if any, has been reached.

Figure 7:
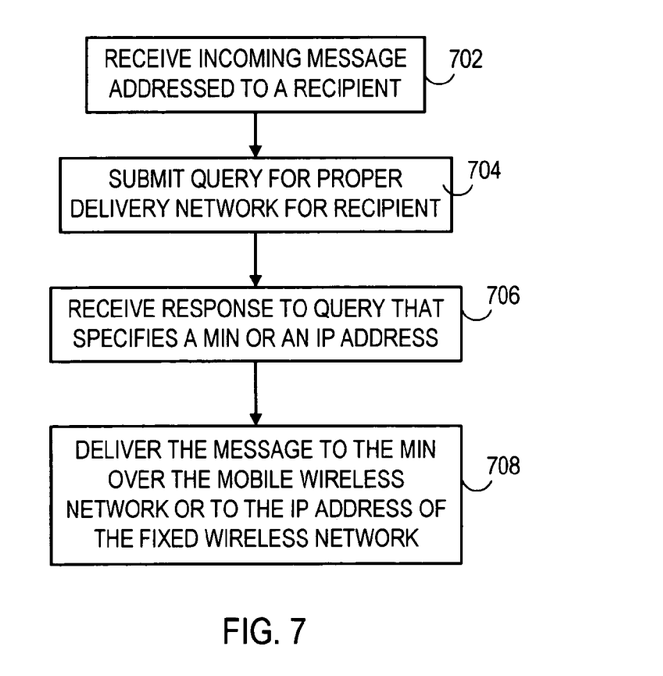
FIG. 7 shows an operational flow of an exemplary message delivery server.

FIG. 7 shows an exemplary set of logical operations performed by the MDS 600, and in particular, the processor 602 in order to deliver messages. At receive operation 702, an incoming message is received that included a message address. The MDS 600 then submits a query for the message address to the presence server 400 at request operation 704 in order to request the proper network to deliver the message over. The MDS 600 then receives a response that specifies the MIN or IP address if registration has occurred, and otherwise a null response, at response operation 706. The MDS 600 then delivers the message through the appropriate interface based on the MIN or IP address of the response at delivery operation or queues the message and then reattempts the query at request operation 704 after a delay period if the response is null. Upon delivering the message, these operations then repeat for the next incoming message.

While the invention has been particularly shown and described with reference to various embodiments thereof, it will be understood by those skilled in the art that various other changes in the form and details may be made therein without departing from the spirit and scope of the invention.

What is claimed is:

1. A presence server comprising:
a processor; and
a memory storing instructions that, when executed by the processor, cause the processor to perform operations comprising:
receiving, via a mobile wireless network and a fixed wireless network, a registration request from a mobile device;
storing the registration request and an identifier of the mobile device in a registration table associated with the wireless network;
transmitting a registration confirmation to the mobile device via the wireless network and the fixed wireless network to indicate successful registrations;
periodically transmitting to the mobile device a request for a heartbeat signal;
receiving the heartbeat signal from the mobile device, wherein the heartbeat signal is received via transmission over each of the mobile wireless network and the fixed wireless network associated with the successful registrations and wherein the heartbeat signal comprises a first measured performance criteria between the mobile device and the mobile wireless network and a second measured performance criteria between the mobile device and the fixed wireless network, wherein the first measured performance criteria comprises an available bandwidth associated with the mobile wireless network and the second measured performance criteria comprises an available bandwidth associated with the fixed wireless network, the available bandwidth associated with the mobile wireless network and the available bandwidth associated with the fixed wireless network determined by the mobile device based on a time to upload a previous heartbeat.

2. The presence server of claim 1, wherein the operations further comprise listening for additional registration messages from the mobile device.

3. The presence server of claim 1, wherein the identifier is a mobile identification number.

4. The presence server of claim 3, wherein the operations further comprise maintaining a separate registration table for each mobile identification number.

5. The presence server of claim 1, wherein the identifier is an internet protocol address.

6. The presence server of claim 5, wherein the internet protocol address is received from an access point coupling the mobile device to the fixed wireless network.

7. The presence server of claim 1, wherein the operations further comprise determining that a registered connection with the mobile wireless network and the fixed wireless network is active upon receiving the heartbeat signal within a determined period.

8. The presence server of claim 7, wherein the operations further comprise determining that a registered connection with the mobile wireless network and the fixed wireless network is inactive upon not receiving the heartbeat signal within a determined period.

9. The presence server of claim 8, wherein the operations further comprise removing the registration request from the registration table.

10. The presence server of claim 1, wherein the operations further comprise determining an optimal wireless network from the mobile wireless network and the fixed wireless network to use for message delivery based upon the first measured performance criteria and the second measure performance criteria.

11. The presence server of claim 10, wherein the operations further comprise transmitting a determination of the optimal wireless network to the mobile device.

12. The presence server of claim 1, wherein the operations further comprise receiving, from a message delivery server, a determination of an optimal wireless network from the mobile wireless network and the fixed wireless network to use for message delivery, the determination being made based upon the first measured performance criteria and the second measured performance criteria.

13. The presence server of claim 12, wherein the operations further comprise transmitting the determination of the optimal wireless network to the mobile device.

14. The presence server of claim 1, wherein the first measured performance criteria further comprise a signal strength of the mobile wireless network.

15. A method comprising:
receiving, by a server comprising a processor, a registration request from a mobile device via a mobile wireless network and a fixed wireless network;
transmitting, by the processor, a registration confirmation to the mobile device via the mobile wireless network and the fixed wireless network;
periodically transmitting, by the processor, a request for a heartbeat signal to the mobile device;
receiving, by the processor, the heartbeat signal from the mobile device, wherein the heartbeat signal being transmitted over each of the mobile wireless network and the fixed wireless network associated with the successful registration and wherein the heartbeat signal comprises a first measured performance criteria between the mobile device and the mobile wireless network and a second measured performance criteria between the mobile device and the fixed wireless network, wherein the first performance criteria comprises an available bandwidth associated with the mobile wireless network and the second measured performance criteria comprises an available bandwidth associated with the fixed wireless network, the available bandwidth associated with the mobile wireless network and the available bandwidth associated with the fixed wireless network determined by the mobile device based on a time to upload a previous heartbeat; and
determining, by the processor, an optimal wireless network to use for message delivery based upon the measured performance criteria.

16. A non-transitory tangible computer-readable medium storing instructions that, when executed by a processor, cause the processor to perform operations comprising:
periodically transmitting to a mobile device a request for heartbeat signal via a mobile wireless network and a fixed wireless network associated with a successful registration;
receiving the heartbeat signal from the mobile device, the heartbeat signal comprising a first measured performance criteria between the mobile device and the mobile wireless network and a second measured performance criteria between the mobile device and the fixed wireless network associated with the successful registration,
wherein the first measured performance criteria comprise an available bandwidth associated with the mobile wireless network and the second measured performance criteria comprise an available bandwidth associated with the fixed wireless network, the available bandwidth associated with the mobile wireless network and the available bandwidth associated with the fixed wireless network determined by the mobile device based on a time to upload a previous heartbeat;
receiving, from a message delivery server, a determination of an optimal wireless network to use for message delivery, the determination being made based upon the measured performance criteria; and
transmitting the determination of the optimal wireless network to the mobile device.

* * * * *